April 1, 1952     S. C. MOON     2,591,089
BELT CONVEYER DRIVE
Filed Feb. 3, 1948     3 Sheets—Sheet 1
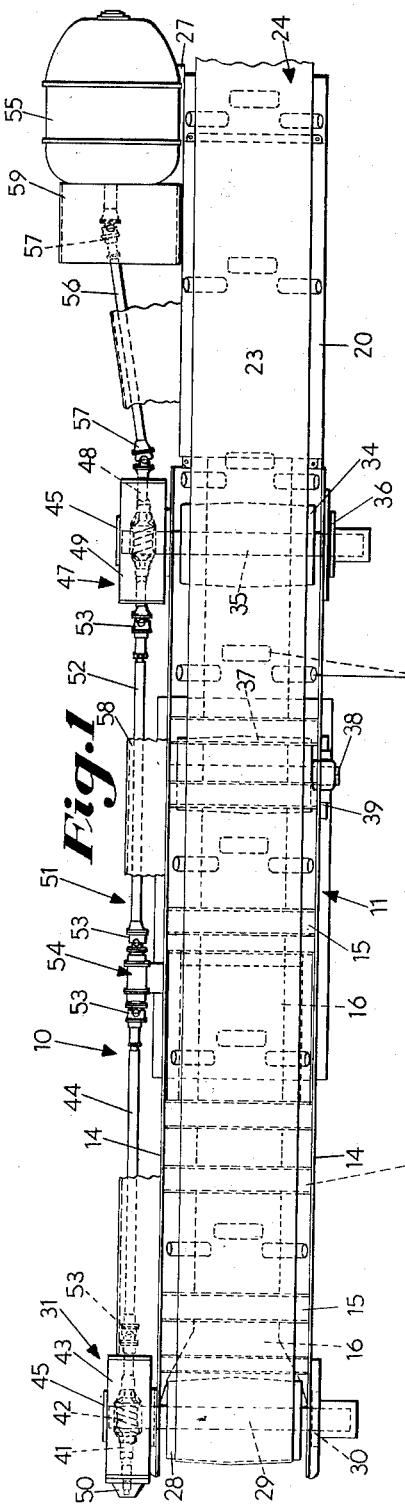
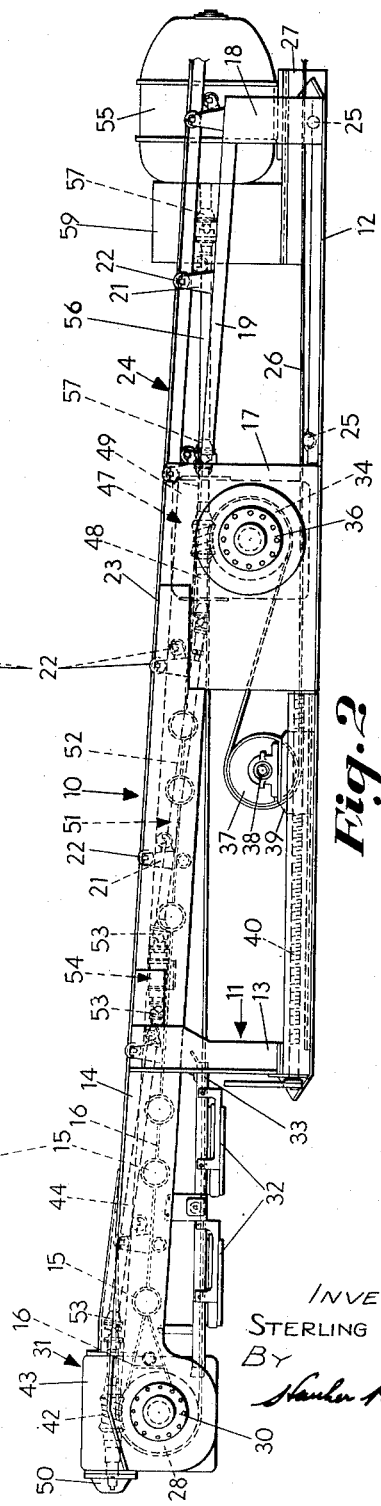
INVENTOR:
STERLING C. MOON,
BY
ATT'Y.

April 1, 1952 S. C. MOON 2,591,089
BELT CONVEYER DRIVE
Filed Feb. 3, 1948 3 Sheets-Sheet 2
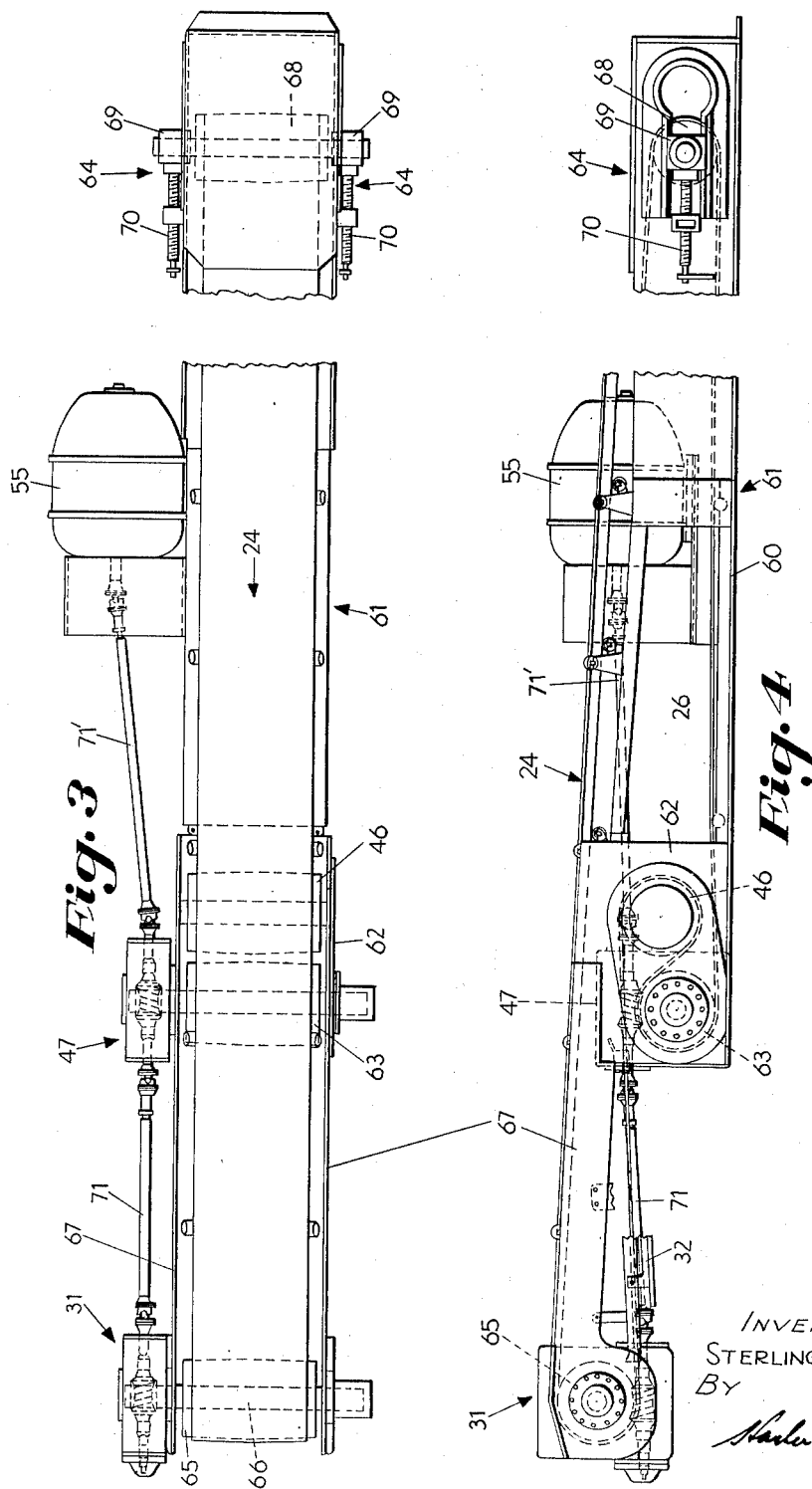
INVENTOR:
STERLING C. MOON,
BY
ATT'Y.

April 1, 1952     S. C. MOON     2,591,089
BELT CONVEYER DRIVE

Filed Feb. 3, 1948     3 Sheets-Sheet 3

INVENTOR:
STERLING C. MOON,
BY
ATTY.

Patented Apr. 1, 1952

2,591,089

UNITED STATES PATENT OFFICE 2,591,089

BELT CONVEYER DRIVE

Sterling C. Moon, Worthington, Ohio, assignor to The Jeffrey Manufacturing Company, a corporation of Ohio Application February 3, 1948, Serial No. 6,035

1 Claim. (Cl. 198—203)

My invention relates to endless belt conveyers and more particularly to the drive, head, or power mechanism of such conveyers.

One object of my invention is to provide an improved endless belt type conveyer, or the head or power section thereof, wherein at least two widely spaced pulleys, preferably the head pulley and another pulley rearwardly thereof, are power driven and wherein power for driving said pulleys is transmitted from a motor to the pulleys, said pulleys being interconnected through a drive shaft that lies parallel with and adjacent one side of the main frame of the conveyer or which extends substantially parallel with and is positioned preferably to one side of the conveyer belt.

Another object of my invention is to provide an improved endless belt type conveyer or power section therefor wherein a plurality of driving pulleys over which the belt of the conveyer is reeved are employed and the pulleys are driven either in the same or opposite directions each through a speed reducing gearing positioned at one side of the main frame of the conveyer, and said speed reducing gearing is interconnected through a drive shaft mechanism which extends along the side of the conveyer frame or substantially parallel with and is positioned preferably to one side of the conveyer belt and located longitudinally, at least in part, between said speed reducing gearings.

Other objects of my invention will appear hereinafter, the novel features and combinations being set forth in the appended claims.

In the accompanying drawings,

Fig. 1 is a view in plan of a head or power section of a conveyer that embodies features of my invention;

Fig. 2 is a side view in elevation of the head or power section shown in Fig. 1;

Fig. 3 is a view in plan of an endless belt conveyer embodying features of my invention with a portion of the conveyer removed;

Fig. 4 is a side view in elevation of the conveyer shown in Fig. 3;

Figure 5:
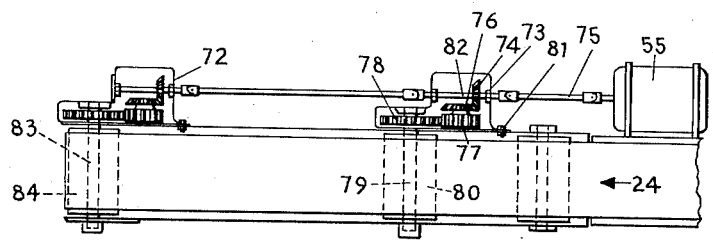
Fig. 5 is a diagrammatic view in plan of still other conveyer head or power section embodying features of my invention.

Referring first to Figs 1 and 2 of the drawings the conveyer head or power section 10 shown therein includes a main frame 11 which is formed by a base pan 12 and spaced upright side members including a pair of front members 13 which extend upwardly from the base pan 12 and support a pair of top spaced main frame side members 14. The side members 14 are interconnected by a plurality of tubular members 15 which are welded at their ends directly to the side members 14 to connect them into a rigid unitary structure. Tubular members 15 are interconnected by a plurality of flat reinforcing and roller bracket supporting plates 16 which are welded at opposite edges to the tubular members 15. Adjacent the discharge end of the main frame 11 the plates 16 are doubled, that is, there is one above the other and opposite ends of the left edges of these plates, as seen in Fig. 1, are welded to the side frame members 14. The rear or left hand end of each of the side frame members 14 is secured to an upright side main frame member 17 which is connected at its bottom to the base pan 12. Extending rearwardly from upwardly extending side plates 17 to other spaced upright side main frame members 18 are support members 19 that carry a deck plate 20 which in turn carries a plurality of generally upwardly extending brackets 21 that receive belt supporting idler rolls 22. Brackets 21 and rolls 22 are also carried by certain of the reinforcing plates 16. Rolls 22 form supports over which the working or conveying run 23 of an endless belt 24 travels and these idler rolls form the conveying or working run 23 of belt 24 into the shape of a trough. The base pan 12 supports idler rolls 25 which carry the return run 26 of the endless belt 24. The foot section, not shown, of the conveyer of which the head section 10 forms a part includes a foot or tail pulley about which the endless belt 24 is reeved and the belt 24 in passing over this pulley leaves the return run 26 and enters the working or conveying run 23.

The main frame 11 includes a detachable motor receiving portion or base 27 which may be moved to either side of the main frame and when in position extends to one side of one of the spaced upright side members of the main frame which upright members are each formed by a side member 14 and upwardly extending side members 13, 17 and 18 and a support member 19. The working or conveying run 23 of the endless belt 24 operates over the trough rolls 22 of the main frame 11 and is reeved about a belt driving head pulley 28 the shaft 29 of which is carried at its end in bearings 30 carried by the side members 14. The ends of the shaft 29 extend through the bearings 30 and outwardly of the main frame 11 and one of its ends is protected by a removable cover carried by one of the frame members 14. The other end of shaft 29 extends into a speed reducing gear mechanism 31 which is outside the opposite member 14 of the main frame 11 and through which the shaft 29 and pulley 28 are driven. This speed reducing gear mechanism 31 is described hereinafter. As the belt 24 leaves the head pulley 28 it begins its return run through the main frame 11, that is, it begins to travel through the main frame 11 toward the foot or tail pulley of the conveyer. Immediately after leaving the head pulley 28 the return run 26 of the conveyer belt 24 slides over a pair of belt cleaner or scraper units 32 which are carried by members 33 that form parts of the main frame 11. From the scraper units 32 the return run 26 passes to a power driven pulley 34 the shaft 35 of which extends across the main frame 11 and the ends of which are supported in bearings 36 carried by the opposite center upright side plates 17 of main frame 11. Return run 26 of belt 24 is reeved over or looped about the pulley 34 and travels forwardly over a third pulley 37 positioned intermediate the head pulley 28 and the rear pulley 34 from which it travels rearwardly through the main frame 11 between the side members thereof and over the rolls 25 to the foot or tail pulley of the conveyer. The intermediate pulley 37 is carried for bodily movement with respect to the power driven pulleys 28 and 34 and the ends of its shaft 38 are carried by slide blocks 39 which are adjusted lengthwise of the frame 11 by an adjusting screw 40. The pulley 37 is bodily movable to provide an adjusting means for adjusting the tension or tautness of the conveyer belt 24. It will be noted that the driving pulley 34 is located longitudinally an appreciable distance to the rear of the power driven head pulley 28. Consequently these interconnected pulleys are widely spaced apart.

The structure of that portion of the conveyer head or power section thus far described with the exception of the speed reducing gear mechanism 31 is well known in the art. Heretofore the pulleys that drove the endless belt have been connected to the driving motor of the conveyer through chains and sprockets which I have entirely eliminated in my improved conveyer construction, therefore the description of the drive mechanisms now to be described when taken alone or with the parallel relationship of the axes of the belt driving pulleys and the relation of the pulleys with respect to the main frame 11 of the belt 24 of the conveyer form important parts of my invention.

The shaft 29 of head pulley 28 extends across the main frame 11 between the side members 14 and is supported therebetween, as previously described, by the bearings 30 carried by the side frame members 14 and one end of the shaft 29 extends into the speed reducing gear mechanism 31. The mechanism 31 includes a gear 41 secured directly to the end of the pulley shaft for driving it and gear 41 is driven by a worm pinion and shaft 42. The pinion shaft 42 is bearinged at both of its ends to the housing 43 of the speed reducing gear mechanism 31 and its rear end extends through the housing and is connected to drive shaft 44 through a universal joint 53 through which the speed reducing gear mechanism 31 and consequently the head or front pulley 28 is driven.

The shaft 35 of the rear pulley 34 like shaft 29 of head pulley 28 is carried in bearings 36 that are supported by the central upright plates 17 of the main frame 11 and one of the extending ends of shaft 35 extends into a speed reducing gear mechanism 47. The structure of speed reducing gear mechanism 47 is identical with that of speed reducing gear mechanism 31 except that in the speed reducing gear mechanism 47 the pinion shaft 48 extends at both of its ends through the housing 49 whereas the shaft 42 of speed reducing gear mechanism 31 extends rearwardly only through the housing of the mechanism, the front of the housing being closed by a bearing covering cap 50.

The rearwardly extending end of pinion shaft 42 of speed reducing mechanism 31 and the forwardly extending end of the worm shaft 48 are interconnected through a drive shaft means 51. Drive shaft means 51 includes the drive shaft 44 and universal joint 53 and a second drive shaft 52 and its universal joints 53. Because the length of the drive shaft means 51 is relatively great and because the drive shaft of means 51 rotates at a relatively high speed, there is provided between the individual drive shafts 44 and 52 a fist structure 54 carried by the side member 14. The fist 54 includes a housing in which there is a through shaft carried in suitable bearings that connects through two of the universal joints 53 the short forward and rearward drive shafts 44 and 52 of drive shaft means 51. Fist 54 is provided to support and prevent whipping of the drive shaft means 51 between the speed reducing mechanisms 41 and 37.

The motor platform or base portion 27 of the main frame 11 is placed to extend outwardly from the same side of the main frame 11 as do the speed reducing mechanisms 31 and 47 in order that the axes of the pinion shafts 42 and 48 of speed reducing mechanisms 31 and 47 and the axis of the armature shaft of motor 55 which is supported by the platform 27 will lie in planes that are substantially parallel with and to the same upright side of the main frame 11. The armature shaft of motor 55 is connected to the rear end of pinion shaft 48 of speed reducing gear mechanism 47 through a short drive shaft 56 including universal joints 57. Each of the drive shafts 44, 52 and 56 are telescopically connected with one of their universal joints and the universal joints are provided to accommodate misalignment of the shafts of the speed reducing gear mechanisms 31 and 47 and the axis of the motor shaft.

It will be seen that when the endless belt 24 is to be driven, the armature shaft of motor 55 will be driven to rotate the drive shaft means 51 including shaft 56, pinion shaft 48, shaft 52, the shaft of fist 54, shaft 44 and the pinion shaft 42, thus providing a drive shaft means that extends along or parallel with one of the upright side members of the main frame 11.

When the conveying or working run 23 of belt 24 is to be driven toward the head pulley 28, the motor 55 is driven in such direction that the speed reducing mechanism 47 will drive the rear belt driving pulley 34 in a clockwise direction, as seen in Fig. 2, and the worm 42 and gear 41 of the speed reducing mechanism 31 will drive the head pulley 28 in a counter-clockwise or reverse direction with respect to the pulley 34. The drive shafts and universal joints of the drive shaft means 51 are protected by a cover 58 which extends from the adjacent side member 14 outwardly and downwardly over them. A suitable guard 59 covers the exposed end of the armature shaft of motor 55 and the universal joint 57 associated therewith.

It will be seen that the structure of the conveyer head or power section 10 provides a pair of speed reducing gear mechanisms and a motor for driving both of them through a drive shaft means that extends to one side of and substantially parallel with the main frame 11, thus providing a drive structure which when associated with a conveyer head or power section provides a section which is relatively narrow and has no chains or the like. It will also be seen that all of the operating parts of the drive mechanism such as the gears and bearings are sealed away from grit and dirt within housings which may contain liquid or semi-liquid lubricants.

Referring again to Fig. 1, because both ends of the pulley shafts 29 and 35 extend through the side members of the conveyer head or power section 10 and because the motor base receiving portion 21 is movable to either side thereof, the drive means 51 and the speed reducing gear mechanisms 31 and 47 may be placed at either side of the main frame 11. The housings of speed reducing gear mechanisms 31 and 47 are each provided with a closure member 45 which may be transferred from side to side of the housing to permit the reception of the extending ends of the drive shaft 29 or 35 when the gear mechanisms are transferred from one side to the other of the conveyer head 10.

Referring now to Figs. 3 and 4, main frame 60 of the head or power section 61 of the conveyer shown is generally similar in structure to the main frame 11 of the conveyer head or power section 10 shown in Figs. 1 and 2 except that its overall length is reduced and therefore the front upright member 62 of its sides support its intermediate and rear belt supporting pulleys 63 and 46. In this conveyer head or power section the belt supporting and driving pulleys are all carried by the upright members which co-operate to form the upright sides of the main frame 60 and the belt adjusting pulley mechanism is contained in the foot or tail section 64 of the conveyer. In the conveyer head or power section 61 there is a power driven head pulley 65 the shaft 66 of which is carried by the forward ends of the side members 67 of the main frame 60 in a manner identical to that in which the pulley 28 and shaft 29 of the main frame 10 of the conveyer head in Figs. 1 and 2 are carried. In this embodiment of my invention the intermediate pulley 63 is power driven while the rear pulley 46 is an idler pulley whereas in the embodiment shown in Figs. 1 and 2 the rearward pulley 34 is power driven and the forward or intermediate pulley 37 is an idler. This arrangement of driven pulleys for driving the belt 24 is preferable in certain instances, for example, when wet or sticky materials are to be conveyed by the working run of the endless conveyer belt because the belt scraper or cleaner unit 32 may not dry the belt but may only imperfectly clean it. When this arrangement of driving pulleys is employed the dry, clean, or non-conveying side of the belt loops over and engages the head and intermediate driving pulleys 65 and 63 and therefore the belt is driven with no slippage between the belt and its driving pulleys due to sticky, wet or foreign material which may adhere to the upper or outer working side of the conveyer belt 24. The foot or tail pulley 68 of this conveyer, as previously mentioned, is the pulley which is utilized for adjusting the tension of the conveyer belt 24. Any suitable mechanism may be employed for moving this pulley bodily with respect to the frame of the conveyer and pulleys 63, 46 and 65.

I have employed as an adjusting mechanism for the foot pulley 68 and at each side thereof, a bearing block 69 which is adjustable longitudinally of the main frame in a rack or way by an adjusting screw 70. In the embodiment of my invention shown in Figs. 3 and 4 the speed reducing gearings for the pulleys 65 and 63 are arranged to be at the same side of the main frame 60. The gearings are identical with those described in connection with the conveyer head or power section 10 shown in Figs. 1 and 2 and therefore are designated by the same numerals. Because the distance between the speed reducing gear mechanisms 31 and 47 in conveyer head 61 is not great these mechanisms are interconnected only by a single drive shaft 71 including universal joints. In head or power section 61 the motor 55 is also attached to the main frame at the same side of and rearwardly of the speed reducing mechanisms 31 and 47 and the armature shaft of the motor 55 is connected to the speed reducing mechanism 47 for pulley 63 through a drive shaft 71' including universal joints. It is to be noted that the housing of the speed reducing mechanism 31 for the pulley 65 of conveyer head or power section 61 is inverted with respect to the speed reducing mechanism 31 as employed in head or power section 10, shown in Figs. 1 and 2, both to reduce the overall height of the discharge end of the conveyer and to permit the same mechanisms to be employed for driving pulleys 65 and 63 in the same direction, namely, counter-clockwise, as seen in Fig. 4. The motor 55, drive shafts 71, 71' and speed reducing gear mechanisms 31 and 47 may be positioned at either side of the main frame 60 of the head or power section 61.

Figure 6:
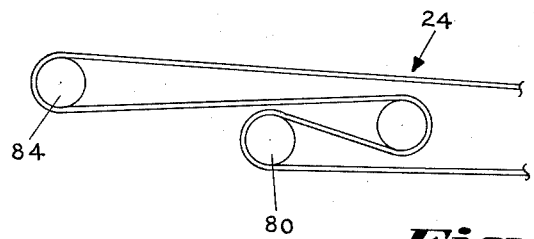
Fig. 6 is a diagrammatic showing of the pulley and belt arrangement of the conveyer head or power section shown in Fig. 5.

The head or power section shown in Fig. 5 is similar to the head or power section 61 shown in Figs. 3 and 4 and has its conveyer belt looped over pulleys, as shown in Fig. 6. The path of the belts and the position of the driving pulleys are identical in both embodiments. The structure of the head or power section shown in Fig. 5 may be similar in all respects to the structure 61 except that here there is substituted for the speed reducing gearings 31 and 47 of Figs. 3 and 4 speed reducing gear mechanisms 72 and 73 which may include gears of the spur type. The gearing in the speed reducing mechanism 73 includes a bevel pinion 74 connected to the motor 55 by a drive shaft 75 including universal joints. The pinion 74 is driven by the motor 55 to drive a large bevel gear 76 which is part of a spur gear 77. Spur gear 77 drives a still larger spur gear 78 which is carried by and drives the shaft 79 of the intermediately positioned belt driving pulley 80 to drive the pulley 80 in a counter-clockwise direction, as viewed in Fig. 6. The shaft 79 of pulley 80 is supported at each of its ends by bearings in the upright members of the sides of the main frame and the housing of speed reducing gearing mechanism 73 is carried by one of the extending ends of shaft 79 which extends through the side of the main frame. The housing of gear mechanism 73 could rotate about the shaft 79 except that I have provided a single anchor 81 for attaching it loosely to the main frame. This method of arrangement of the speed reducing gear mechanism permits it to be carried floatingly both by the frame and the pulley shaft 79. The pinion shaft 82 which carries beveled pinion gear 74 extends through the housing of mechanism 73 and is connected with the speed reducing gear mechanism 72 on shaft 83 of the head pulley through a drive shaft including universal joints. Speed reducing gear mechanism 72 is identical in construction to speed reducing gear mechanism 73 and is mounted to the shaft 83 and the main frame of the conveyer in a manner that is identical to that by which the mechanism 73 is mounted. However, it is to be noted in connection with speed reducing gear mechanism 72 that the pinion gear shaft does not extend through the front of the housing. In operation when the motor 55 is operated the head pulley 34 and pulley 80 are both driven in the same direction.

It is to be noted that in all of the embodiments of my invention which I have shown the shafts of all of the belt driving pulleys extend to both sides of the conveyer frame, are parallel with each other, and each of their ends is carried by one of the opposite side members of the main frame. Because the pulley shafts extend through both sides of the main frame, the speed reducing gearing and motor 55 may be transposed from side to side of the main frame, as desired. All of the members co-operating to form the speed reducing gear mechanism and the motor are positioned at the same side of the conveyer frame and they are connected by a drive shaft means which lies substantially parallel with the main frame and to one side thereof. Stated in another way, the speed reducing gearing, the motor and the interconnecting drive shaft means are substantially in alignment and extend longitudinally of the endless conveyer belt and at one side thereof. It is also to be noted that the improved drive means which I have provided entirely avoids the use of sprockets and chains and permits of a selection of any one or any combination of the pulleys of the head section to be employed to drive the endless conveyer belt. Therefore, if the conveyer is to convey wet or sticky material, the head or intermediate pulleys may be used as the driving pulleys and if the conveyer is to convey dry material the head and rear pulleys may be selected as driving pulleys, if desired.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention, what I desire to secure by Letters Patent of the United States is:

An endless belt conveyer including a head section having a main frame including spaced upright side members, a head pulley at the front of said frame and between the side members thereof, an endless belt reeved over said pulley to form an upper conveying run and a lower return run, a pair of closely positioned pulleys spaced longitudinally rearwardly of said head pulley an appreciable distance over which the return run of said endless belt is reeved, a drive shaft for said head pulley, a drive shaft for one pulley of said pair of pulleys, said drive shafts extending transversely of said frame and having their ends projecting laterally beyond the sides thereof, drive mechanism for said pulley drive shafts including a speed reducing gear mechanism carried on one end of each of said shafts and on the same side of said frame, a motor on said frame spaced longitudinally rearwardly of the rearmost of said speed reducing gear mechanisms, and drive shaft means extending longitudinally and laterally of said frame interconnecting said motor and speed reducing gear mechanisms including a shaft having a universal joint adjacent each end interconnecting said motor and the rearmost of said speed reducing mechanisms, and drive shaft means having a universal joint at each end thereof interconnecting said speed reducing gear mechanisms, said pulley drive shafts projecting laterally beyond the sides of said frame as aforesaid to receive said drive mechanism upon either side of said frame.

STERLING C. MOON.

REFERENCES CITED

The following references are of record in the file of this patent:

UNITED STATES PATENTS

| Number | Name | Date |
| --- | --- | --- |
| 1,693,344 | Morgan | Nov. 27, 1928 |
| 1,945,744 | Levin | Feb. 6, 1934 |
| 2,168,622 | Levin | Aug. 8, 1939 |
| 2,215,647 | Lightfoot | Sept. 24, 1940 |

FOREIGN PATENTS

| Number | Country | Date |
| --- | --- | --- |
| 419,322 | Great Britain | Nov. 9, 1934 |
| 549,013 | France | Nov. 7, 1922 |